Oct. 29, 1935.  R. J. SHERMAN  2,019,059

MARINE EXPLORATION APPARATUS

Filed April 9, 1932  2 Sheets-Sheet 1

INVENTOR
RUSSELL J. SHERMAN
BY
William C. Parnell
ATTORNEY

Patented Oct. 29, 1935

2,019,059

UNITED STATES PATENT OFFICE 2,019,059

MARINE EXPLORATION APPARATUS

Russell J. Sherman, Bloomfield, N. J.

Application April 9, 1932, Serial No. 604,134

7 Claims. (Cl. 61—69)

This invention relates to marine apparatus for exploring the sea bottom or intermediate levels and observing, photographing and televising marine life, sunken ships or other objects of interest.

The object of the invention is an organization of apparatus of this kind which is capable of functioning at great depths with relatively little hazard to human life or to the apparatus used.

In accordance with the general features of the invention a buoyant sphere or diving bell is provided with an anchor block of sufficient mass that the bell may be lowered to any desired depth or may be maintained suspended at a fixed distance from the sea bottom as determined by the length of the cables connecting the block to the bell. One or more observation windows is provided and preferably located eccentrically with respect to the vertical axis of the bell. The bell may be equipped with a camera of any desired type or with television apparatus, or both, which may be controlled within the bell or from the surface by means of suitable electrical connections. The powerful flood lights necessary for illuminating the field of observation are disposed around the windows in water-proof housings external to the bell and directly exposed to the water so that the heat generated by the lamps is readily dissipated.

This apparatus is particularly well adapted to exploring the sea bottom for, since the bell exerts no pull on the main cable when the anchor block is resting on the sea bottom, the cable may be slackened to prevent movements of the ship due to ground swells from causing movements of the bell which make observation difficult or impossible in many of the diving bells proposed heretofore. This bell is designed to function in various ways entirely under remote control; for example, either the moving picture camera or the television set may be mounted in operative relation to an observation window or both the camera and the set may be used in which case the television set may be used to observe over-extensive periods and advise the operator of the receiving set on the ship when something of interest is within the field of observation at which times the camera may be energized to obtain pictures without unnecessary waste of film.

The apparatus is equally suited to serve as an observation chamber for an operator who may use one window for direct observation and set the camera or television apparatus in operation only while something is within the field as indicated by his direct observation through the other window. To this end various additional facilities are provided such as air conditioning apparatus, telephone connection with the ship above and means for permitting observation for a considerable time without discomfort.

An important feature of the invention is means for releasing the bell from the anchor block and supporting cable to permit it to return to the surface by means of its own buoyancy. The releasing mechanism can be made effective in emergencies whether or not an observer is within the bell and hence it not only prevents loss of human life but also effects the recovery of the bell itself if the main cable breaks or becomes fouled. In its preferred form this mechanism comprises plugs in the anchor and connecting blocks forming attachment points for the cable, a propellent charge of explosive in each recess and means for exploding the charge to expel the plugs.

These and various other features of the invention will be more clearly understood from the following detailed description and the accompanying drawings in which.

Figure 1:
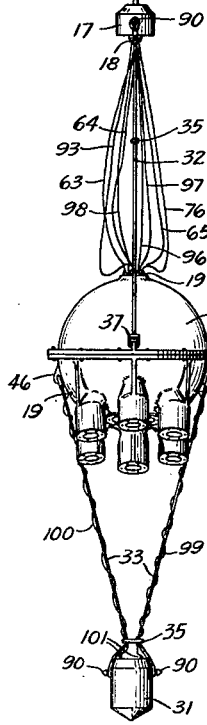
Fig. 1 is the general view of the diving apparatus suspended from the deck of a ship.

Fig. 1 shows the bell 11 suspended from boom 12 on the ship 13 by means of a cable 14 which comprises a number of power supply and control conductors surrounded by heavy armor of sufficient strength to support the bell and accessory apparatus. The ship is provided with suitable hoisting equipment and a control board for the various electrical circuits required for operating the associated apparatus. When the bell is used at great depths the weight of the long length of cable required sets up a very great tension in the portions of the cable near the surface. In order to avoid the necessity of using very large cable, floats 15 may be secured to it at intervals as it is being lowered to make the cable self-supporting or partly so and permit the use of much smaller cable than would otherwise be required. The armor 16 is secured to the connecting block 17 by suitable clamping means 18 but the conductors, which are preferably stranded and very well insulated, extend beyond the block and make connections with the apparatus within the bell through individual water-proof fittings 19. Since the apparatus is intended to function at depths in which the water pressure may be several thousand pounds per square inch, care must be taken to prevent leakage where the conductors pass into the bell. Between the connecting block and the point of entrance to the bell, each conductor is of a length different from that of any of the others for reasons explained below.

Figure 5:
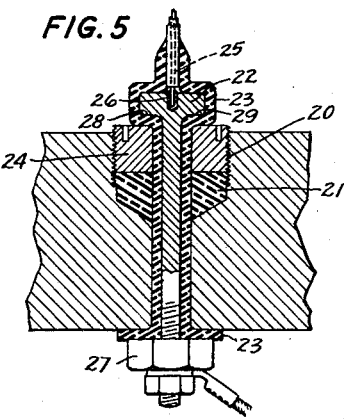
Fig. 5 shows one way of leading the electrical conductors into the bell.

One effective device for this purpose and for preventing the conductors from being forced into the bell by the high water pressure is shown in Fig. 5. A threaded recess 20 in the housing is partially filled with a suitable resilient material 21, such as live rubber, through which the member 22 encased in rubber 23 or other insulation material passes. A hollow plug 24 fits tightly over the insulation and when screwed down against the resilient material 21 forces it into intimate contact with the conductor forming a water-tight joint even for very high pressures. The conductor 25 is securely fastened into the recess 26 in the member 22, the rubber 23 then being formed around the insulation of the conductor and vulcanized to it. The rubber also insulates from the housing the nut 27 which holds shoulders 28, 29 of the member 22 in tight contact with the member 24.

A slightly modified form of this device may be used also to conduct the high tension ignition wires leading to the explosion chamber 30 in the connecting and anchor blocks 17 and 31, respectively. These wires, however, being very small are less likely to be forced into the bell by the pressure of the water. Moreover, other considerations make it preferably to use a modified spark plug for this purpose as will be explained. The blocks 17 and 31 are preferably located at a distance from the bell, of several times the bell diameters, so that when the explosion occurs the bell will not be damaged by concussion or by the plugs striking it. As a further precaution against lashing of the cables 32, 32 and 33, 33 against the bell each pair may be secured together by suitable shackles 35.

Figure 2:
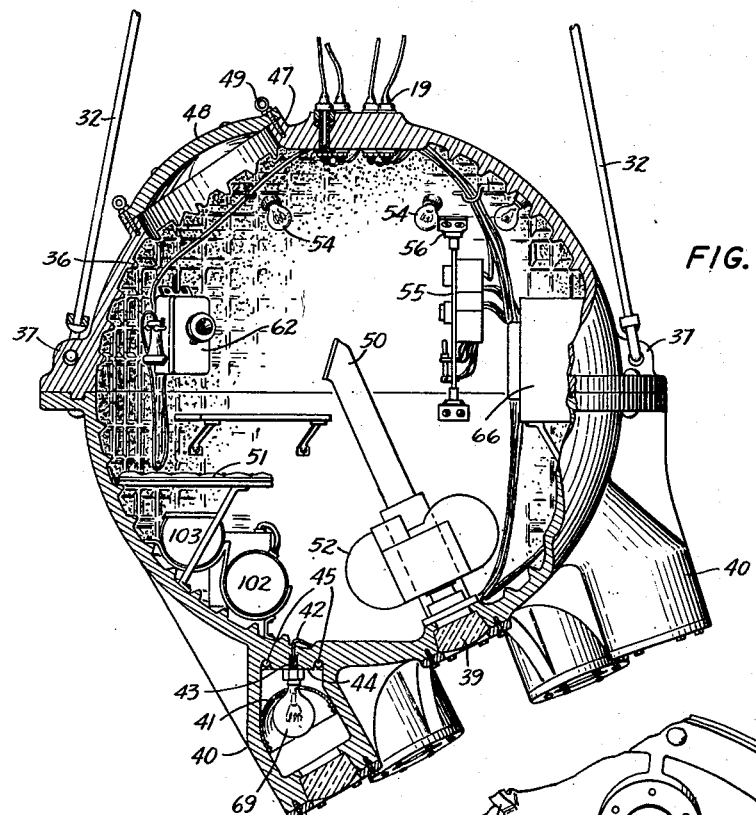
Fig. 2 is a sectional view of the bell and the apparatus therein.
Figure 3:
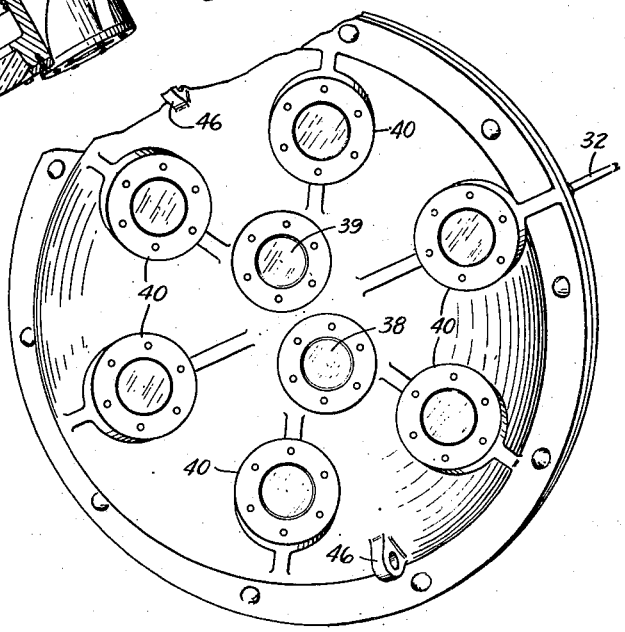
Fig. 3 is a detail of the flood lights and observation window arrangement.

The bell itself may be a metal sphere reenforced with internal webbing 36 for increased strength as shown in Fig. 2. It is preferably made in two or more sections bolted together and provided with suitable attaching lugs 37, 37 for the cables 32. The observation and camera or television windows 38, 39 (Fig. 3) are preferably located in the lower portion of the bell with their axes converging slightly so that the same field of view, to one side of the anchor block, is visible from both windows. Lamp housings 40 of the desired number are disposed around the windows in the manner indicated to concentrate the illumination on the field of view. The lamp housing, the camera and observation windows are preferably of fused quartz thick enough to withstand high pressure and tapered to fit a recess in the housing. The windows may be ground to form object lenses thus taking advantage of their relatively large diameter for light gathering purposes. Since at great depths the darkness necessitates intense illumination, the lamps are of relatively high power and are provided with reflectors 41 to concentrate a beam of light on the area under observation.

The power supply conductor 42 enters the lamp housings through a water-tight connection 43 similar to those already described and preferably the housing is used as a return conductor, the supply circuit being grounded to the bell adjacent the control panel. If a lamp housing becomes broken due to accidental contact with a submerged object, or for any other reason, the water cannot enter the bell and observation may be continued by means of the remaining lights. In most instances, the heat generated by the lamps will be satisfactorily conducted away by the water surrounding the housing but if necessary in a particular case cooling coils may be attached to the outer surface of the bell and connected to the coils 45 to circulate cold water around the hot metal 44 in the housing.

It will be noted that the flexible anchor block tie cables 33 are connected to lugs 46 on the bell below the center line on either side of the observation windows so that as shown in Fig. 1 they do not obstruct the view. The connecting block cables 32 are connected to lugs 37 above the center of gravity and preferably at intermediate points to prevent the bell from oscillating while being lowered or raised.

The bell is provided with a hatch 47 large enough to admit an observer and any auxiliary apparatus required and a suitable cover 48 with convenient means 49 for securely fastening it in place. By locating the hatch as shown the extra mass of the heavy flange and cover tends to counterbalance the lamp housings to maintain the bell in an upright position. The apparatus should be arranged in the bell for the maximum convenience of the observer consistent with maintaining equilibrium. The oxygen and lime tanks 102 and 103 used for air conditioning may be located under the bench 51. The telephone set 62 is conveniently mounted near the bench. If desired the telephone may be of the head-set and breast-plate transmitter type so that the observer may be in constant communication with the surface while observing and making notes and sketches. Ordinarily, when the observer is within the bell, window 38 will be utilized for direct observation with the aid of an extension tube 50 having the necessary lenses and prisms fitted against the window and terminating in a location convenient to the observer when he is seated on the bench 51. Either the camera 52 or the television apparatus 53 would be positioned against window 39 and covered in such a way that the lights 54 in the bell do not interfere with its operation. The camera is preferably electrically controlled and may be of either the "still" or motion picture type as desired. The control panel 55, the circuit of which is shown in Fig. 4 is conveniently located in front of the observer's bench and may be mounted on brackets 56 so that it can be swung out of the way when the camera or television apparatus requires attention.

Figure 4:
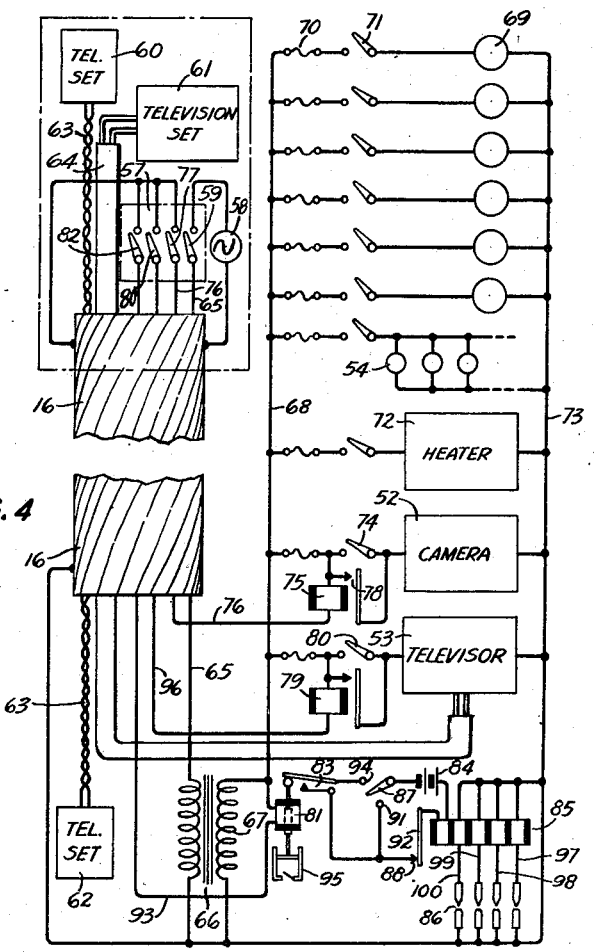
Fig. 4 is a diagram of the controlling circuits in the bell.

The operation of the apparatus will be more clearly understood by considering the circuit diagram Fig. 4. The control panel 57 located on the ship 13 controls an alternating current generator 58 or other suitable supply source by means of a switch 59. A telephone set 60 and television receiving apparatus 61 are associated with the panel and connected to corresponding apparatus 62 and 53 in the bell 11 by cables 63 and 64, the latter containing the synchronizing and picture transmitting circuits for the television sets. Power is supplied to the bell by means of conductor 65 preferably at high voltage to avoid excessive loss in the transmission and to permit a conductor of small cross section to be used. This conductor is connected to the primary winding of transformer 66 and the circuit is completed by means of a connection to the cable armor 16 as shown. The secondary winding 67 of the transformer is also grounded to the armor by way of the bell and supplies power to the main bus-bar 68 on the control panel 55. The flood lights 69 are provided with individual fuses 70 and control switches 71 so that trouble in any one unit does not disable the whole apparatus. Similar separate circuits supply power to the lights 54 inside the bell, a heater unit 72 for keeping the bell at a comfortable temperature and any other incidental apparatus desired, the return circuit to the transformer consisting in each case of conductor 73 representing the housing of the bell. The circuit for the motor of the camera 52 contains a switch 74 for local control and a relay 75 for remote control over a circuit extending from the bus-bar 68 through the relay winding, conductor 76, switch 77 on the panel 57 to the grounded armor 16. The operation of the relay completes a circuit to the camera at contact 78, it being understood that switch 74 is open except when closed by an observer within the bell. In a similar manner relay 79 controls the television apparatus 53 by means of switch 80.

The automatic releasing mechanism includes an induction coil 85 having a primary winding circuit which may be energized by dry cell batteries 84 and four secondary windings, one for each of the spark gaps 86 one of which is located in each explosion chamber of the connecting and anchor blocks 17 and 31. If the main supporting cable becomes fouled or broken while an observer is within the bell so that the bell cannot be recovered in the usual manner, the observer may close key 87 on the contact 91. This completes the primary circuit of the induction coil and causes armature 92 to vibrate in such a manner that a high potential is induced in the secondaries of the coil and impressed on the gaps 86. When the apparatus is used without an observer power is applied to the transformer 67 before the bell is submerged; switch 82 on the control panel 57 is closed to energize the relay 81 from the transformer over a circuit including conductor 93, the switch and the cable armor as the grounded return. The operation of the relay opens contact 83 and permits key 87 to be closed on contact 94 to prepare the primary circuit of the coil 85 for operation under emergency conditions. The hatch cover 48 may then be secured in place and the bell lowered for operation in any of the ways already mentioned.

If, under these circumstances, the main cable breaks the power supply will be cut off and relay 81 will release its armature to close contact 83 which completes the primary circuit and sets the coil 85 in operation as before. If for any reason the cable fouls but does not break the coil may be operated by opening the power supply switch 59 or the switch 82 in the conductor 93. It will be seen that switch 82 is not essential to the operation but as shown it provides a separate remote control for the relay 81 which may be convenient under certain conditions. In order to prevent false operation of the release mechanism, switch 87 will always be open as shown when an observer is within the bell and relay 81 is provided with a dash-pot or other slow releasing device 95 so that a momentary failure of the power supply due to vibration of switch 59 or other causes will not cause contact 83 to close and operate the mechanism. If desired, the device 95 may take the form of a clock-operated delay mechanism or any equivalent device to provide ample time to restore power to the transformer 67 and avoid false operation in cases of inadvertent interruption of the power supply.

Figure 6:
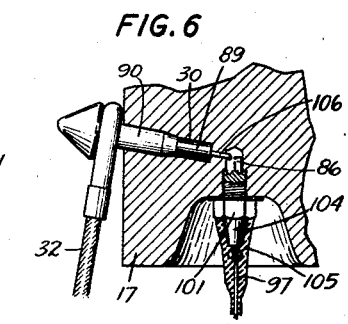
Fig. 6 is a detail of an explosion chamber and releasable plug.

A typical connecting block release mechanism as shown in Fig. 6 comprises a pin 90 driven tightly into a hole in the connecting block 17 to provide an attaching member for the cable 32. Since the cables 32 and 33 form a part of electrical circuits care must be taken to make good electrical connection between their ends and the pins 90 and lugs 46 and 37. Beyond the end of the pin 90 there is an explosion chamber 30 containing a charge of suitable propellent explosive. The ignition device 101 which threads into the block 15 to form a water-tight joint is similar to an ordinary spark plug except that the central porcelain member 104 surrounding the conductor is replaced by or encased in rubber or other insulation 105 so that the wire from the induction coil may be connected to the conductor and the joint insulated for the high voltage used. It will also be understood that these devices must be of very rugged construction in order to withstand the water pressure and the concussion of the explosions.

The end of the pin 90 is shaped as shown to facilitate its sudden expulsion against high pressure. When the explosions occur all four plugs are expelled, thereby releasing the bell from the anchor block and the main cable except for the electrical conductors. The bell is so proportioned that with all the necessary apparatus and an observer within it, its buoyancy is still greatly in excess of the strength of any single conductor. As already stated the conductors are of different lengths so that the stress due to the buoyant force is applied to the conductors singly and successively causing them to be broken or pulled out one at a time until the bell is entirely freed from the anchor block and the cable and continues to rise to the surface. The explosions will, of course, set up considerable disturbance in the water around the bell which will cause it to oscillate but due to the very considerable excess weight in the lower portion of the bell, represented by the lamp housings and internal apparatus, the bell soon comes to rest in a substantially upright position. If necessary, of course, additional weight in the form of ballast can be added as required. The bell therefore maintains its upright position as it rises and due to the relatively large water displacement as compared with the buoyancy it cannot attain an excessive speed.

It will be understood while the aparatus has been described with reference to a particular arrangement of apparatus and circuit connections, that many modifications will occur to those skilled in the art within the scope of the following claims.

What is claimed is:

1. The combination with a buoyant deep sea diving bell, an anchor block and a connecting block secured to the bell, and a combined supporting and control cable comprising a plurality of electric conductors terminating in the bell and protecting and supporting armor surrounding the conductors secured to and terminating in the connecting block, of means within the bell for automatically releasing it from the blocks to permit the buoyant force on the bell to break the conductors and free it from the supporting cable.

2. Diving apparatus comprising in combination, a buoyant diving bell, a main supporting cable terminating in a connecting block, connecting members extending between the block and the bell, an anchor block of mass greater than the buoyancy of the bell and flexible connectors between the anchor block and the bell secured to the bell at points intermediate the attachment points of the connecting members.

3. The combination with a deep sea buoyant diving bell and a combined main supporting and control cable therefor, of an anchor block, and a connecting block, tie cables between the bell and said blocks, chambers containing explosive charges in the blocks, pins in the chambers forming attachment points for the tie cables, and means in the bell operative upon the breaking of the main cable for igniting the charges to expel the pins and free the bell from the blocks.

4. The combination with a deep sea buoyant diving bell and a combined main supporting and control cable therefor, of an anchor block, and a connecting block, tie cables between the bell and said blocks, chambers containing explosive charges in the blocks, pins in the chambers forming attachment points for the tie cables, and means for freeing the bell from the blocks comprising an ignition system for the explosive charges, and means within the bell and other means remote from the bell for initiating the operation of the ignition system.

5. The combination with a buoyant diving bell and a combined main supporting, control and power supply cable therefor, of an anchor block and a connecting block, tie cables between the bell and said blocks, an ignition system in the bell, means responsive to the operation of the ignition system for releasing the bell from the blocks, means effective upon the failure of the power supply to initiate the operation of the ignition system, and means for delaying the operation of said system.

6. The combination with a buoyant diving bell, an anchor block, a connecting block and tie cables between the blocks and the bell, a supporting cable terminated at the connecting block and means for releasing the bell from the blocks, of power supply and control cables looped between the connecting block and the bell, said looped cables being of different lengths whereby the buoyant force on the bell successively breaks the cables when the bell is released from the anchor block.

7. The combination with a buoyant deep sea diving bell, an anchor block of sufficient mass to overcome the buoyancy of the bell and connecting means between the block and the bell, of a chamber in the block containing an explosive charge, a pin in the chamber forming an attachment point for the connecting means, and means for igniting the charge to expel the pin from the chamber.

RUSSELL J. SHERMAN.